United States Patent
Konik et al.

(10) Patent No.: US 8,396,846 B2
(45) Date of Patent: Mar. 12, 2013

(54) DATABASE TRIGGER MODIFICATION SYSTEM AND METHOD

(75) Inventors: Rafal Przemyslaw Konik, Oronoco, MN (US); Mark William Theuer, Rochester, MN (US); Michael Alan Venz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 11/955,506

(22) Filed: Dec. 13, 2007

(65) Prior Publication Data

US 2009/0157737 A1 Jun. 18, 2009

(51) Int. Cl.
*G06F 17/30* (2006.01)

(52) U.S. Cl. ..................................... 707/702

(58) Field of Classification Search ............... None
See application file for complete search history.

(56) References Cited

U.S. PATENT DOCUMENTS

| | | | | |
|---|---|---|---|---|
| 5,873,075 A * | 2/1999 | Cochrane et al. | | 1/1 |
| 5,930,795 A * | 7/1999 | Chen et al. | | 1/1 |
| 6,026,410 A * | 2/2000 | Allen et al. | | 1/1 |
| 6,356,903 B1 * | 3/2002 | Baxter et al. | | 707/702 |
| 6,374,236 B1 * | 4/2002 | Chen et al. | | 1/1 |
| 6,405,212 B1 * | 6/2002 | Samu et al. | | 1/1 |
| 6,594,656 B1 * | 7/2003 | Arlein et al. | | 1/1 |
| 6,684,215 B1 * | 1/2004 | Saracco | | 707/100 |
| 6,691,127 B1 * | 2/2004 | Bauer et al. | | 707/102 |
| 6,711,560 B2 * | 3/2004 | Levy et al. | | 1/1 |
| 6,721,725 B2 * | 4/2004 | Levy et al. | | 1/1 |
| 6,732,084 B1 * | 5/2004 | Kabra et al. | | 1/1 |
| 6,763,358 B2 * | 7/2004 | Anderson et al. | | 707/702 |
| 6,820,080 B2 * | 11/2004 | Anderson et al. | | 707/702 |
| 7,634,510 B2 * | 12/2009 | Marwah | | 1/1 |
| 7,805,423 B1 * | 9/2010 | Romine et al. | | 707/704 |
| 2001/0049682 A1 * | 12/2001 | Vincent et al. | | 707/100 |
| 2002/0174129 A1 * | 11/2002 | Aldrich et al. | | 707/101 |
| 2005/0125371 A1 * | 6/2005 | Bhide et al. | | 707/1 |

OTHER PUBLICATIONS

"Database Trigger", Wikipedia, 2011.*
"Trigger", Microsoft Computer Dictionary, fifth edition, 2002, p. 530.*
"Trigger", Oracle 9i, Database Concepts, Mar. 2002.*

* cited by examiner

*Primary Examiner* — Fred I Ehichioya
*Assistant Examiner* — Michelle Owyang
(74) *Attorney, Agent, or Firm* — Toler Law Group

(57) ABSTRACT

A method, apparatus and program product modify the behavior of a database trigger. An attribute desired by a user for a database trigger may be received. The attribute may relate to a change in the functionality of the trigger, such as a restriction on trigger behavior. An object that includes the attribute may be generated. The attribute may be associated with and applied to the trigger. In this manner, the attribute may be selectively applied to multiple triggers.

20 Claims, 2 Drawing Sheets

DATABASE TRIGGER MODIFICATION SYSTEM AND METHOD

FIELD OF THE INVENTION

The present invention relates generally to data processing, and more specifically, to the management of data stored in computer databases.

BACKGROUND OF THE INVENTION

Enhancing processes within rigidly designed software can be challenging. System integrators and software vendors conventionally design systems with current enterprise needs in mind, and without regard to potential modifications. Consequently, the systems tend to be inflexible. This is particularly true for database applications. The original design of a database schema dictates what actions the application can perform. This type of database schema design leaves little room for future enhancement.

Two approaches are conventionally used to address the above stated problem of database enhancement. One approach is conventionally provided by the software, itself. The software may have the ability to send messages that regard application actions to other applications for analysis. For example, WebSphere® Commerce Suite, available from International Business Machines Corporation (IBM), has the ability to send a message with regard to detailed purchase order information. This message may then be sent to an enterprise resource planning system or a customer relationship management system for analysis and possible further action.

Software developers can provide the second approach. Specifically, developers can create triggers within the software application according to the expected needs of the enterprises. Triggers are procedures, or sets of Structured Query Language (SQL) statements that are stored in a database. Originally developed by IBM, SQL provides an interface with which to make queries into databases. The triggers are executed, or fired, when a table is modified. Triggers are powerful tools that may be used to perform many tasks, such as restricting access to specific data, logging, or auditing of data sets. A trigger is activated whenever a specified event, such as an insert, delete, or update event, occurs on a particular table. As such, a trigger consists of an event (an INSERT, DELETE, or UPDATE statement issued against an associated table) and an action (the related procedure). Also, triggers have an activation time, such as before, after, or instead of the triggering event. Triggers are used to preserve data integrity by checking on or changing data in a consistent manner.

Using this second approach, developers are required to allocate large amounts of time to understand the relationship between application actions and the data persistency within the associated database(s). This is particularly true where a programmer at the user level desires to modify a preprogrammed trigger. Any such modification requires the user to code the adapted trigger characteristics into each trigger. This approach is very time consuming and relies heavily on the developer's database skills and understanding of database table relationships. Third party software packages that can create and use triggers often cannot be modified, at all. The users generally do not have access to the propriety source code.

As a result, enterprises with changing process needs are forced to go back to the system integrator or software vendor to request a redesign of the database schema to change triggering capabilities, or to hire database experts to thoroughly analyze the database schema to discover triggers scenarios. Both of these options create large expenditures for the enterprise and cause decreased productivity due to delayed system modifications.

Therefore, there exists a need for an improved manner of modifying database trigger behavior for software applications.

SUMMARY OF THE INVENTION

The present invention provides an improved computer implemented method, apparatus and program product for modifying an environmental attribute of a trigger included within a database. Aspects of the invention include receiving an attribute desired by a user for the trigger. The attribute may relate to a modification desired for a functional capability of the trigger. An object may be generated that includes the attribute, and the attribute may be applied to the trigger.

Aspects of the invention may apply the attributes to multiple triggers. For instance, an attribute may be applied to all, or to a selective subset of triggers in a program.

Embodiments consistent with the underlying principles of the present invention may prompt the user for the attribute. For instance, aspects of the invention may include an interface for automatically prompting the user for the attribute.

In realizing aspects of the invention, embodiments may associate the attribute with the trigger. When processing a trigger, aspects of the invention may determine if the trigger is associated with the object and, by association, the attribute.

Examples of attributes may relate to a functional capability of a trigger, such as a recursive capability, a trigger nesting capability, and a profile or a cycle associated with the trigger. Other attributes may include insert, update, delete and read data capabilities. Another exemplary attribute may include a restricted access capability, a trigger selection capability and a propagation capability.

Further aspects of the invention may determine if a logical error will result from applying the attribute to the trigger. Where so configured, an error message may be generated in response to the determination.

These and other advantages and features that characterize the invention are set forth in the claims annexed hereto and forming a further part hereof. However, for a better understanding of the invention, and of the advantages and objectives attained through its use, reference should be made to the Drawings and to the accompanying descriptive matter in which there are described exemplary embodiments of the invention

DETAILED DESCRIPTION

Figure 1:
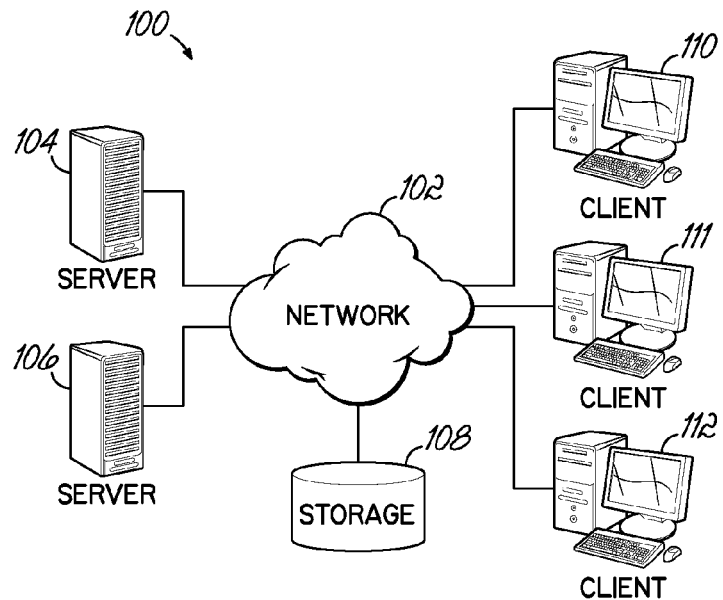
FIG. 1 is a pictorial representation of a network of data processing systems in which aspects of the present invention may be implemented.

Embodiments consistent with the principles of the present invention provide a computer implemented method, apparatus, and computer usable program code for automatically modifying an environmental attribute of a database trigger. Aspects of the invention provide a common and standard environment that may be shared across multiple triggers to realize greater control of trigger operations.

Embodiments consistent with the invention may generate a trigger that specifies an attribute, or performance characteristic, that in turn, defines an environment, such as an object. Aspects of the invention receive an attribute desired by a user for the trigger. The attribute may relate to a change in the functionality of the trigger, such as a restriction on trigger behavior. An object that includes the attribute may be generated. The attribute may be associated with and applied to the trigger. In this manner, the attribute may be selectively applied to multiple triggers.

Embodiments consistent with the underlying principles of the present invention may define a trigger environment, or object. The object may be tied to a trigger, or file. Once the environment is defined, the environment may be reused by multiple triggers, or scoped to a single trigger. This environment/object may include one or more specific attributes relating to modifying the trigger in a desired manner. Before the trigger is fired, these attributes may be propagated along with the trigger, or as a set of triggers are fired. A graphical user interface (GUI) may allow for the user to define a new object called a modifying object. This new, modifying object may allow the user to define attributes relating to the trigger.

A trigger may be fired for any input/output (I/O) operation with a before or after attribute for executing the trigger action relative to the I/O operation. Examples of I/O operations include insert, update, delete and read operations. Conventionally, users do not have a process by which they can create a trigger to specify certain characteristics that define a trigger environment, unless the user implements the code in the trigger program. Such an endeavor can be problematic because the user must define characteristics by coding them into all of the user's triggers. These processes can also impact performance because the trigger must be executed and implemented at the user level. Third party software packages that use triggers usually cannot be modified by the user of such applications. The user may not have the source code, which may be proprietary. Such scenarios can present a problem to the system database administrator who might like to restrict or otherwise modify the environment.

An example of a desired restriction may include when a user does not want a trigger to cause other triggers to be fired, as is the case with trigger nesting. Another desirable restriction may pertain to restricting the number of cascading trigger firings, or restricting a cyclic trigger. A cyclic trigger may include a scenario where a number of triggers are singularly fired, and an original trigger is fired a second time. A system administrator may want to restrict trigger activity, to invoke triggers with new authorities, to restrict operations on files and other objects, and/or to restrict access to other systems.

Embodiments consistent with the invention may allow users to accomplish such modifications by prompting the input of attributes. The attributes may be used via a modifying object/environment to modify the environmental attribute of the trigger.

One exemplary attribute may regard a maximum nesting level of a trigger, i.e., the number of times a trigger may invoke another trigger. Such an attribute may restrict the number of nesting levels. For instance, the system may use a counter to ensure that no more than 300 nesting levels are allowed for a trigger. Such a feature may minimize the possibility of infinite nesting loops.

Another attribute may pertain to an authority, or profile, to invoke the trigger. A profile may define user permissions. For instance, a profile may include rules indicating how much authority a user has to access certain environments, or objects. In one example, an attribute may stipulate that a trigger runs under a specific user's profile.

Still another attribute may relate to a maximum number of times a cycle of triggers may be invoked, or fired. As such, attributes may pertain to restricted operations by trigger programs.

NOUPDATE, NOINSERT, NODELETE, NOREAD statements and other restrictions may be added at any time. A NOUPDATE attribute may be used where a programmer does not want a trigger to update any files. This scenario may be useful in certain security situations, such as where a virus is present in a machine. Similarly, other trigger attributes may respectively restrict the trigger related insertion, deletion and reading of text or other data.

Attributes may relate to restriction connection/access to other systems. Such an attribute may prevent a trigger program from going to a remote system. That is, an embodiment consistent with the invention may apply an attribute to prevent a trigger from henceforth operating in a system other than the one on which the trigger is currently running.

Where desired, an attribute may include a name of a trigger, along with a command designating all or a selection, e.g., a subset, of other triggers.

Another attribute may propagate from trigger to trigger. For instance, a user may be able to select via an interface, "yes," or "no," pertaining to whether an attribute which should be propagated from trigger to trigger. Attributes of one modifying object, which are associated with a first trigger, may be propagated to another modifying object that is associated with a second trigger.

Figure 2:
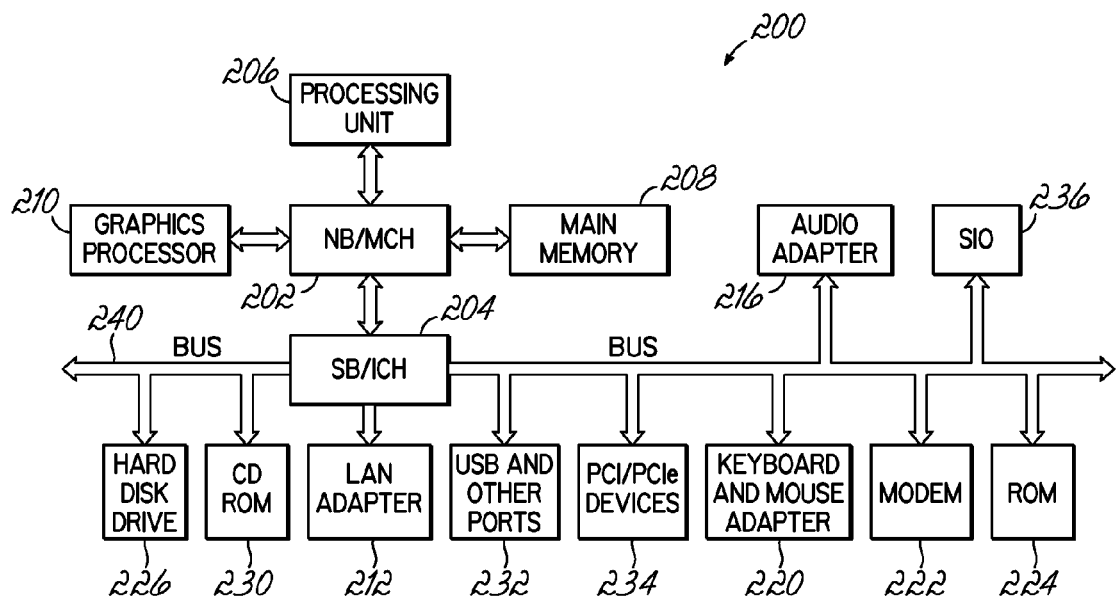
FIG. 2 is a block diagram of a computer system in which aspects of the present invention may be implemented.

With reference now to the Drawings, and in particular, with reference to FIGS. 1 and 2, exemplary diagrams of data processing environments are provided in which embodiments of the present invention may be implemented. It should be appreciated that FIGS. 1 and 2 are only exemplary and are not intended to assert or imply any limitation with regard to the environments in which aspects or embodiments of the present invention may be implemented. Many modifications to the depicted environments may be made without departing from the spirit and scope of the present invention.

Turning more particularly to FIG. 1, a pictorial representation of a network of data processing systems is shown in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102, along with the storage 108. In addition, clients 110, 111, and 112 connect to network 102. These clients 110, 111, and 112 may be, for example, personal computers or network computers. In the depicted example, server 104 provides data, such as boot files, operating system images, and applications to clients 110, 111, and 112. Clients 110, 111, and 112 are clients to server 104 in this example. Network data processing system 100 may include additional servers, clients, and other devices not shown.

As shown in the embodiment of FIG. 1, network data processing system 100 may include the Internet, with network 102 representing a worldwide collection of networks and gateways that communicate using the Transmission Control Protocol/Internet Protocol (TCP/IP) suite of protocols. At the heart of the Internet is a backbone of high speed data communication lines between major nodes or host computers, consisting of thousands of commercial, governmental, educational and other computer systems that route data and messages. Of course, network data processing system 100 also may be implemented as a number of different types of networks, such as an intranet, a local area network (LAN), or a wide area network (WAN). FIG. 1 is intended as an example, and not as an architectural limitation for different embodiments of the present invention.

Referring now to FIG. 2, a block diagram of a data processing system 200 is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture that includes north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and controls various components within data processing system 200. An object oriented programming system, such as the Java Virtual Machine (Java is a trademark of Sun Microsystems, Inc.), may run in conjunction with the operating system. The Java Virtual Machine (JVM) may provide calls to the operating system from Java programs, or applications, executing on data processing system 200.

As a server, data processing system 200 may be, for example, IBM's iSeries midrange server. Data processing system 200 may be a symmetric multiprocessor (SMP) system including a plurality of processors in processing unit 206. Alternatively, a single processor system may be employed.

Instructions for the operating system, the object oriented programming system, and/or programs are located on storage devices, such as HDD 226, and may be loaded into main memory 208 for execution by processing unit 206. The processes for embodiments of the present invention may be performed by processing unit 206 using computer usable program code, which may be located in a memory, such as main memory 208, the ROM 224, or in one or more peripheral devices 226 and 230.

Those of ordinary skill in the art will appreciate that the hardware in FIGS. 1 and 2 may vary depending on the implementation. Other internal hardware or peripheral devices, such as flash memory, equivalent nonvolatile memory, or optical disk drives and the like, may be used in addition to or in place of the hardware depicted in FIGS. 1 and 2. Also, aspects of the present invention may be applied to a multiprocessor data processing system.

While aspects of the present invention may lend themselves particularly well to use in connection with a JVM, it should be understood that features of the present invention may have application in other object oriented computing systems. Those skilled in the art will recognize that the exemplary environments illustrated in FIGS. 1 and 2 are not intended to limit the present invention. Indeed, those skilled in the art will recognize that other alternative hardware environments may be used without departing from the scope of the invention.

In some illustrative examples, data processing system 200 may be a personal digital assistant (PDA), which is configured with flash memory to provide nonvolatile memory for storing operating system files and/or user generated data.

A bus system may comprise of one or more buses, such as bus 238 or bus 240, as shown in FIG. 2. The bus system may be implemented using any type of communication fabric or architecture that provides for a transfer of data between different components or devices attached to the fabric or architecture. A communication unit may include one or more devices used to transmit and receive data, such as the modem 222 or the LAN adapter 212 of FIG. 2. A memory may be, for example, the main memory 208, the ROM 224, or a cache, such as that found in NB/MCH 202 in FIG. 2. The depicted examples in FIGS. 1 and 2 and the above described examples are not meant to imply architectural limitations. For example, data processing system 200 also may be a tablet computer, laptop computer, PDA or telephone device.

Figure 3:
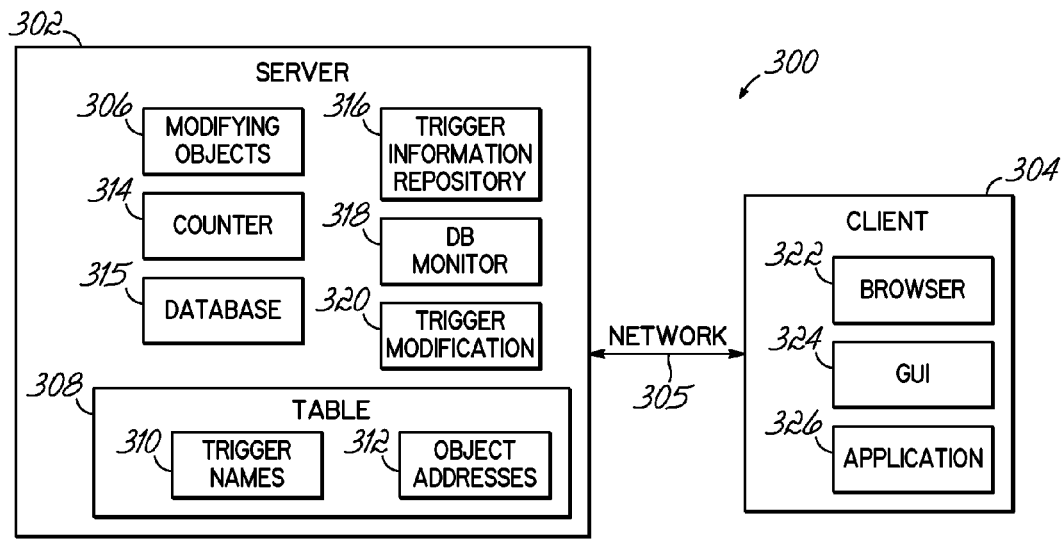
FIG. 3 is a block diagram illustrating components of server and client computers used for modifying attributes associated with triggers in accordance with an embodiment of the present invention.

Turning now to FIG. 3, the illustration includes a block diagram that shows components of a server and a client used for automatically modifying an attribute of a trigger. Distributed data processing system 300 includes a server 302 and a client 304, which are coupled together by the network 305.

The server 302 may include modifying objects 306, or Trigger Environment Attributes (TEA's), as well as a system table 308, which includes trigger names 310 associated with object addresses 312. When a modifying object 306 is defined for a trigger, the system table 308 may contain the name of the trigger and the address of the associated modifying object 306. The table may be used and otherwise accessed when a trigger is prepared to be fired. Like other objects, the modifying objects 306 comprise both data structures and operations, known collectively as methods. Methods access and manipulate data structures, including triggers. Objects having identical data structures and common behavior can be grouped together into classes. Each object inherits the data structure and methods of the particular class from which it was instantiated. Further, a hierarchical inheritance relationship exists between multiple classes.

The server 302 may also include a counter 314 used to track changes in database 315, and a trigger information repository containing SQL and/or other trigger related data. A database monitor 318 is shown in FIG. 3, as is a trigger modification program 320. As with the other components included within the server 302 of FIG. 3, the database 315 and trigger modification program 320 may reside in another server, such as the server 106 in FIG. 1, and/or within a storage unit, such as the storage unit 108 in FIG. 1. Moreover, all such components may be included within a single database of the server of another embodiment, or within a plurality of databases.

The client 304 may include browser 322, graphical user interface (GUI) 324, and the application 326. The browser 322 may be utilized for connecting the client 304 with the server 302 over the network 305. GUI 324 is used to provide a means for an end user, such as an application developer, to interact, for example, with the application 326 and the server 302.

The application 326 may comprise a software application designed to request information from database 315, or to manipulate data by inserting, deleting, or updating data within the database 315. In other words, the database 315 may be associated with the application 326 in distributed data processing system 300. The application 326 may be any type of software application utilized by an enterprise employing embodiments of the present invention.

Where desired, the various software components may also be resident on, and may execute on, other computers coupled to the data processing system 300. It should be appreciated that other software environments may be utilized in the alternative.

In general, the routines executed to implement the illustrated embodiments of the invention, whether implemented as part of an operating system or a specific application, program, object, module or sequence of instructions, may be referred to herein as computer programs, algorithms, or program code. The computer programs typically comprise instructions that, when read and executed by one or more processors in the devices or systems in data processing system 300, cause those devices or systems to perform the steps necessary to execute steps or elements embodying the various aspects of the invention.

Moreover, while the invention has and hereinafter will be described in the context of fully functioning computer systems, those skilled in the art will appreciate that the various embodiments are capable of being distributed as a program product in a variety of forms. The embodiments apply equally regardless of the particular type of computer readable media used to actually carry out the distribution. Examples of computer readable media comprise recordable type media and transmission type media. Examples of recordable type media include volatile and nonvolatile memory devices, floppy and other removable disks, hard disk drives, magnetic tape, and optical disks (CD-ROMs, DVDs, etc.). Examples of transmission type media include digital and analog communication links.

Figure 4:
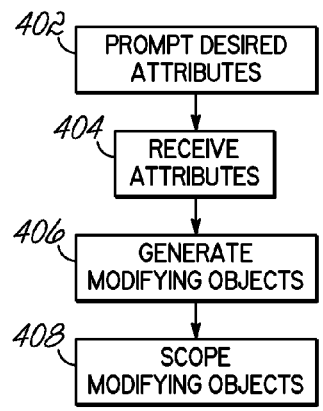
FIG. 4 is a flowchart having steps executable by the system of FIG. 1 for generating and associating a modifying object configured to modify one or more triggers.

FIG. 4 shows a flowchart 400 having steps executable by network data processing system 100 of FIG. 1 for generating and/or associating a modifying object configured to modify one or more environmental attributes of a trigger. In one respect, FIG. 4 shows a deployment phase of an embodiment consistent with the present invention.

Turning more particularly to the flowchart 400, network data processing system 100 may prompt a user at block 402 for attributes. The attributes may be desired for one or more triggers. For instance, a user may desire that an attribute associated with a trigger affect the maximum nesting level associated with the trigger. It may be desired that a ceiling of 1,000 nested trigger operations be applied to the behavior, or operation, of a nested trigger. Other exemplary attributes may restrict cascading or cyclic trigger firings, and/or restrict access to other systems Network data processing system 100 may receive the attributes from the user at block 404 of FIG. 4. Network data processing system 100 may use at block 406 the received attributes to generate a modifying object 306 having Trigger Environment Attributes (TEA's). That is, the modifying object 406 is generated to include the input attributes.

At block 408 of FIG. 4, the user may scope the modifying object 306. For instance, the user may determine that the modifying object 306 should be applied or otherwise associated with one or more triggers, or old triggers, or some other advantageous association. Such an association may be manifested in the system table 308.

Figure 5:
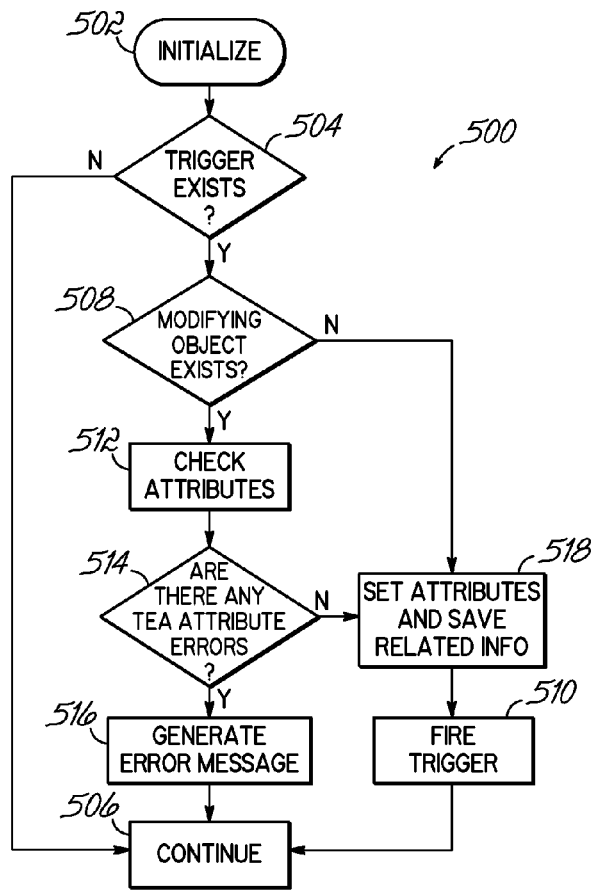
FIG. 5 is a flowchart having steps executable by the system of FIG. 1 for applying attributes to a trigger in order to modify the behavior of the trigger.

FIG. 5 is a flowchart 500 having steps executable by network data processing system 100 of FIG. 1 for applying attributes to a trigger in order to modify the behavior, or functionality, of the trigger. In so doing, the embodiment of FIG. 5 may track processes associated with a one time application of the trigger modification program 320. In a sense, the steps of the flowchart 500 may correspond to a runtime, or execution phase, of an aspect of the invention.

Turning more particularly to the processes of the flowchart 500, the trigger modification program 320 and other processes may initialize at block 502. At block 504 of FIG. 5, network data processing system 100 may check the program code to determine if a trigger exists for the file of the particular record that is being accessed. If not, then network data processing system 100 may continue at block 506 to access a next record.

Alternatively, if the trigger does exist at block 504, then network data processing system 100 may determine at block 508 if a modifying object 306 exists. As discussed herein, network data processing system 100 may determine if a modifying object 306 is associated with the trigger by referencing the system table 308. If not, at block 508, then network data processing system 100 may fire, or execute, the trigger at block 510.

Alternatively, network data processing system 100 may check the attributes at block 512 where the modifying object 306 is determined to exist at block 508. That is, embodiments may check the attributes against the trigger.

As discussed herein, exemplary attributes may restrict trigger nesting, as well as cyclic and cascading trigger firings. Other attributes may invoke triggers with new authorities and profiles, restrict operations on files and other objects, and/or restrict access to other systems. NOUPDATE, NOINSERT, NODELETE, NOREAD statements and other restrictions may be added at any time. Such trigger attributes may respectively restrict the trigger related updates, insertions, deletions and reads of text or other data. Where desired, an attribute may include a name of a trigger, along with a command designating all triggers or a subset of other triggers. Still another attribute may propagate from trigger to trigger.

Network data processing system 100 may determine at block 514 if there are any TEA attribute errors. If so, network data processing system 100 may generate at block 516 an error message. An attribute error may include a programmatic, or logical conflict. For instance, network data processing system 100 may fire a trigger having an attribute that restricts a number of recursions to a maximum limit. An error may occur when the trigger is invoked at a point where the actual number of recursions has already exceeded the maximum limit. Where a programmer may decide whether to modify the pertinent attribute where an error message is received at block 516.

Where no attribute error are determined at block 514 to exist, then network data processing system 100 may set or update the attributes at block 518. That is, the attributes may be applied to the trigger. The modifying object 306 and its associated attributes may be applied to the trigger at block 518. For purposes of this specification, applying and modifying the trigger may pertain to automatically modifying the attributes of an existing trigger, as well as to automatically modifying the attributes of a trigger while the trigger is created.

Network data processing system 100 may additionally save at block 518 information related to program processes and the modifying object 306. Network data processing system 100 may then fire the trigger at block 510 and continue execution of the next record at block 506.

A benefit realized by embodiments of the present invention may include that the user may apply a modifying object 306 and associated attributes to one, many, or all triggers. The user may have the ability to have the same trigger attributes affecting as many triggers as needed.

FIG. 4 shows a flowchart 400 having steps executable by network data processing system 100 of FIG. 1 for generating and/or associating a modifying object configured to modify one or more triggers. FIG. 4 more particularly shows a deployment phase of an aspect of the present invention.

Turning more particularly to the flowchart 400, network data processing system 100 may prompt at block 402 a user for attributes. The attributes may be desired for one or more triggers. For instance, a user may desire that an attribute associated with a trigger affect the maximum nesting level of the trigger.

Network data processing system 100 may receive the attributes at block 404 of FIG. 4 from the user. Network data processing system 100 may use at block 406 the received attributes to generate a modifying object 306.

In operation, embodiments consistent with the invention may allow users to accomplish such modifications by prompting the input of attributes. The attributes may be used via a modifying object/environment to modify the trigger. One exemplary attribute may pertain to an authority or profile to invoke the trigger. Another attribute may regard a maximum nesting level of a trigger. Still another attribute may relate to a maximum number of times a cycle of triggers may be invoked. As such, attributes may pertain to restricted operations by trigger programs. NOUPDATE, NOINSET, NOUPDATE, NODELETE, NOREAD statements and other restrictions may be added at any time. Attributes may relate to restriction connection/access to other systems.

An attribute may include a name of a trigger, with all support for all triggers. Another attribute may propagate from trigger to trigger. For instance, a user may be able to select via an interface, "yes," or "no," pertaining to whether an attribute should be propagated from trigger to trigger.

When a modifying object 306, or TEA, is defined for a trigger, the system table 308 may contain the trigger name 310 and the address 312 of the modifying object 306. The system table 308 may be used and otherwise accessed when a trigger is prepared to be fired.

When a user defines the execution attributes for a trigger, a modifying object 306 may be created. A system table 308 may include the trigger name 310 and modifying object address 312. When a file that includes a trigger is accessed, and before the trigger is executed, the system table 308 may be accessed to determine if the modifying object 306 is associated with the trigger. If a modifying object 306 exists, the application 326 invoking the trigger may evaluate the modifying object 306, and implement the attributes defined by the user.

After the first trigger is executed, the application 326, or program, invoking the first trigger may track the system information related to the trigger with the modifying object 306. Embodiments may process the information to maintain and track information should the modifying object 306 propagate the attributes of the next trigger.

In operation, when a user defines the execution attributes for a trigger, a modifying object 306 may be created. A system table 308 may include the trigger name 310 and modifying object address 312. When a file that includes a trigger is accessed, and before the trigger is executed, the system table 308 may be accessed to determine if the modifying object 306 is associated with the trigger. If a modifying object 306 exists, the trigger modification program 320 invoking the trigger may evaluate the modifying object 306 and implement the attributes defined by the user. After the first trigger is executed, the program invoking the first trigger may need to track the system information related to the trigger with the modifying object 306. The program may process the information needed to maintain and track information if the modifying object 306 would propagate the attributes of the next trigger.

Embodiments of the present invention allow the user to modify objects and associated attributes to one, many, or all triggers. The user may also have the ability to have the same trigger attributes affecting as many triggers as needed.

While the present invention has been illustrated by a description of various embodiments and while these embodiments have been described in considerable detail, it is not the intention of the Applicants to restrict, or, in any way limit the scope of the appended claims to such detail. For instance, because the Java object oriented computing environment is well understood and documented, many aspects of the invention have been described in terms of Java and Java based concepts. However, the Java and Java based concepts are used principally for ease of explanation. The invention is not limited to interactions with a Java object oriented computing environment. The invention in its broader aspects is therefore not limited to the specific details, representative apparatus and method, and illustrative example shown and described. Accordingly, departures may be made from such details without departing from the spirit or scope of Applicants' general inventive concept.

What is claimed is:

1. A method, implemented by a computer, of modifying an existing trigger included within a database, wherein existing trigger includes a functional capability including one of a recursive capability and a trigger nesting capability when executed by a first operating system, the method comprising:
   receiving user input that includes an attribute desired by a user for the existing trigger, wherein the attribute desired by the user prevents the existing trigger from initiating an action executed by a second operating system;
   generating in response to the user input a first modifying object associated with the existing trigger and that includes the attribute desired by the user that prevents the existing trigger from initiating the action executed by the second operating system, wherein the first modifying object tracks information relating to the existing trigger;
   indicating an association between the first modifying object and the existing trigger in a table;
   accessing a file that includes the existing trigger during runtime;
   in response to accessing the file that includes the existing trigger, and before the existing trigger is executed, determining if any modifying object is associated with the existing trigger by accessing the table;
   in response to determining if any modifying object is associated with the existing trigger by accessing the table, determining from the table that the first modifying object is associated with the existing trigger; and in response to determining from the table that the first modifying object is associated with the existing trigger, applying the attribute desired by the user from the first modifying object to the existing trigger to modify the existing trigger during the runtime.

2. The method of claim 1, further comprising applying the attribute to multiple triggers.

3. The method of claim 1, further comprising selectively applying the attribute to multiple triggers.

4. The method of claim 1, further comprising prompting the user for the attribute.

5. The method of claim 1, further comprising providing an interface for prompting the user for the attribute.

6. The method of claim 1, further comprising notifying the user when a logical error will result from applying the attribute of the first modifying object to the existing trigger.

7. The method of claim 1, further comprising firing the existing trigger modified by application of the attribute desired by the user from the first modifying object.

8. The method of claim 1, wherein the table includes a name of the existing trigger and an address of the first modifying object.

9. An apparatus, comprising:
a memory storing a first operating system and an existing trigger that includes a functional capability including one of a recursive capability and a trigger nesting capability when executed by the first operating system;
program code resident in the memory; and
a processor in communication with the memory and configured to execute the program code to modify the existing trigger included within the memory by:
receiving user input that includes an attribute desired by a user for the existing trigger, wherein the attribute desired by the user prevents the existing trigger from initiating an action executed by a second operating system,
generating in response to the user input a first modifying object associated with the existing trigger and that includes the attribute desired by the user that prevents the existing trigger from initiating the action executed by the second operating system, wherein the first modifying object tracks information relating to the existing trigger,
indicating an association between the first modifying object and the existing trigger in a table,
accessing a file that includes the existing trigger during runtime,
in response to accessing the file that includes the existing trigger, and before the existing trigger is executed, determining if any modifying object is associated with the existing trigger by accessing the table,
in response to determining if any modifying object is associated with the existing trigger by accessing the table, determining from the table that the first modifying object is associated with the existing trigger, and
in response to determining from the table that the first modifying object is associated with the existing trigger, applying the attribute desired by the user from the first modifying object to the existing trigger to modify the existing trigger during the runtime.

10. The apparatus of claim 9, wherein the processor is further configured to apply the attribute to multiple triggers.

11. The apparatus of claim 9, wherein the processor is further configured to associate the attribute with the existing trigger.

12. The apparatus of claim 9, wherein the processor is further configured to prompt the user for the attribute.

13. The apparatus of claim 9, wherein the processor is further configured to provide an interface for prompting the user for the attribute.

14. The apparatus of claim 9, wherein the processor is further configured to notify the user when a logical error will result from applying the attribute of the first modifying object to the existing trigger.

15. The apparatus of claim 9, wherein the processor is further configured to fire the existing trigger modified by application of the attribute desired by the user from the first modifying object.

16. The apparatus of claim 9, wherein the table includes a name of the existing trigger and an address of the first modifying object.

17. A program product, comprising:
program code to modify an existing trigger that includes a functional capability including one of a recursive capability and a trigger nesting capability, wherein the existing trigger is stored within a memory, by:
receiving user input that includes an attribute desired by a user for the existing trigger, wherein the attribute desire by the user prevents the existing trigger from initiating an action executed by a remote operating system,
generating in response to the user input a first modifying object associated with the existing trigger and that includes the attribute desired by the user that prevents the existing trigger from initiating the action executed by the remote operating system, wherein the first modifying object tracks information relating to the existing trigger,
indicating an association between the first modifying object and the existing trigger in a table,
accessing a file that includes the existing trigger during runtime,
in response to accessing the file that includes the existing trigger, and before the existing trigger is executed, determining if any modifying object is associated with the existing trigger by accessing the table,
in response to determining if any modifying object is associated with the existing trigger by accessing the table, determining from the table that the first modifying object is associated with the existing trigger, and
in response to determining from the table that the first modifying object is associated with the existing trigger, applying the attribute desired by the user from the first modifying object to the existing trigger to modify the existing trigger during the runtime; and
a tangible computer readable storage medium storing the program code.

18. The program product of claim 17, further comprising program code to determine when a logical error will result from applying the attribute of the first modifying object to the existing trigger.

19. The program product of claim 17, wherein the attribute includes a maximum number of times the existing trigger modified by application of the attribute desired by the user from the first modifying object invokes another trigger.

20. The program product of claim 17, wherein the attribute includes a noupdate attribute to prevent the existing trigger modified by application of the attribute desired by the user from the first modifying object from updating a file.

* * * * *